Oct. 6, 1931.  B. GRAY  1,825,860

WHEEL RIM LOCK

Filed Oct. 29, 1928

INVENTOR.
Bony Gray.
BY
Thorpe Thorpe  ATTORNEYS.

Patented Oct. 6, 1931

1,825,860

UNITED STATES PATENT OFFICE

BONY GRAY, OF KANSAS CITY, MISSOURI, ASSIGNOR OF ONE-HALF TO JAMES S. WARREN, OF KANSAS CITY, MISSOURI

WHEEL RIM LOCK

Application filed October 29, 1928. Serial No. 315,686.

This invention relates to devices for guarding against the theft of tires from automobiles and more particularly its object is to provide primarily against the theft of tires from wheels, by preventing the removal of the demountable wheel rims carrying such tires, it being of course understood that protection is also contemplated for rims equipped with tires for use as spares, suitable carriers in such case, taking the place of the wheel felloes.

There are various means for clamping split tire-carrying rims on wheel felloes or carriers. The most common type is that in which a non-rotatable bolt extends through the felloe or carrier, whether of wood or metal, and is engaged at its outer end by wedge lugs clamped by nuts against and between the rim and felloe or carrier for the purpose of securing the latter rigidly in position.

Demountable rims of the type described can be quickly removed, as all that is needed is a proper wrench for the removal of the clamping nut or nuts, the removal of the nut or nuts permitting the lug or lugs to be slipped off the end or ends of the bolt or bolts preliminary to the removal of the rim and the tire thereon, it being of course understood that in the case of a wheel the latter should first be jacked up. Owing to the fact that rims and tires may thus be quickly and easily removed by anyone, there is a very heavy loss of rims and tires through theft, and my object is to provide a simple, strong, durable and inexpensive combined lock, lug and bolt, having such relationship that the rim cannot be removed without effecting unlocking action of the lock by the use of a proper key.

With this object in view, the invention consists in certain novel and useful features of construction and combinations of parts as hereinafter described and claimed; and in order that it may be fully understood, reference is to be had to the accompanying drawings, in which:

Figure 3:
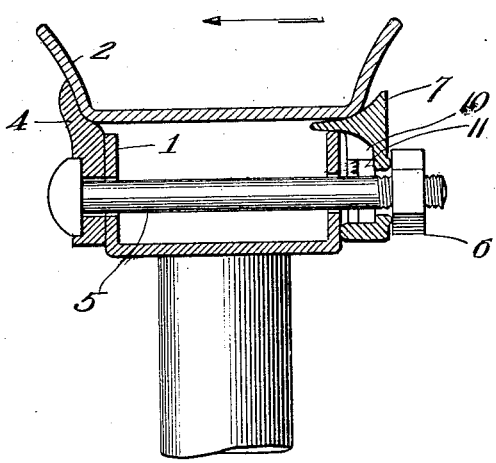
Figure 3 is a section on the same scale as Figure 2, taken on the line III—III of Figure 1.
Figure 4:
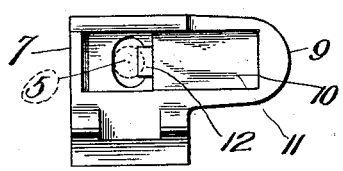
Figure 4 is an inside face view of the combined clamping lug viewed as though the corresponding part of Figure 2 was tipped forward from a vertical to a horizontal plane.

Referring now to the drawing in detail, with particular reference to the lock as used in conjunction with a wheel, 1 indicates the felloe and 2 the customary or any preferred type of demountable rim equipped or adapted to be equipped with a tire 3. One conventional type of felloe is equipped at a suitable number of points with lugs or extensions 4, to form stops for the rim when slid upon the wheel in the direction indicated by the arrow, Figure 3. Bolts 5 extend through the extensions and felloe, and when in final position are non-rotatable. In many types the heads of the bolts are flattened at one side for engagement with the extensions or the felloe to prevent turning of the bolts when the customary clamping nuts 6 thereon are screwed home, there being the usual wedge lugs 7 fitted on the bolts between the felloe and respective nuts so as to clamp the rim firmly in position. The construction thus far referred to is conventional, and my improvement consists in making one of the lugs 7 of such form that it can carry a lock, and in providing the corresponding bolt 5 with a side slot or socket 8 for the reception of the slide bolt of the lock, it being understood it is only necessary for the proper securement of the rim against theft to provide one of my special bolts and lugs on each wheel.

Figure 1:
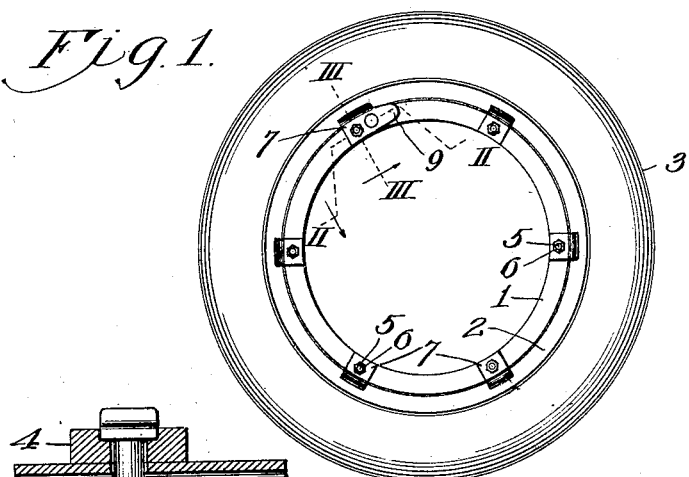
Figure 1 is an outside elevation of a wheel provided with a rim locking device embodying the invention.
Figure 2:
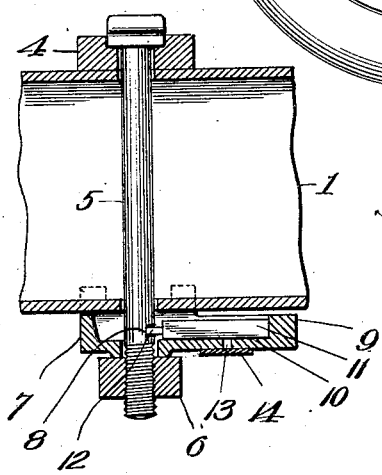
Figure 2 is an enlarged section taken on the line II—II of Figure 1.

The lug to be locked is provided with an extension 9, provided on its inner side with a longitudinal channel 10, and secured in said channel by molding or in any other suitable way so that it cannot be dislodged, is a lock 11, shown in this instance as of the conventional slide-bolt type, the bolt element 12 being adapted when projected, to engage the slot or socket in the side of the clamping bolt, as shown most clearly by Figure 2. The lock casing will of course have the usual keyhole (not shown) registering with a corresponding hole 13 in the outer face of the lug, and to exclude dirt and the like from the lock, a keyhole guard 14 is pivoted to the lug and adapted to be held flatly against the latter by friction to prevent accidental movement and exposure of the keyhole to mud and snow. When it is desired to effect locking or unlocking action of the bolt the guard is swung aside so that the key may be fitted in the lock.

The special lug is applied in operative position and clamped in place by one of the nuts 6 in the usual manner, and if the bolt head and the seat therefor in lug or extension 4, are formed so that the notch or socket in the bolt cannot be faced in any direction but toward the slide bolt of the lock, it will be apparent that when the device is clamped home by the nut 6, the operation of locking the lug in place is effected by merely inserting the key in the lock, turning the key and then removing it, and that the reverse of these manipulations effects the withdrawal of the slide bolt and permits the lug to be removed preliminary to the removal of the rim and tire.

While, as stated, only a single locking mechanism of the character described is needed for each wheel, it will be understood that if two or more are applied on each wheel at opposite or at substantially equi-distant points, the loosening of the respective nuts will not result in the corresponding lugs backing away and hence permitting the rim to become dislodged and endangering the driver and passengers of the car, as the engagement of the locking bolts with the respective sockets or slots of the clamping bolts, will prevent the lugs from backing off or the bolts from sliding inwardly, for a sufficient period of time, under ordinary circumstances, for the driver to reach a place where correction of the trouble can be effected, it being of course understood that should the clamping nuts work backward, a clicking noise would occur, due to the fact that there would be some play between the unclamped bolt or bolts 5 and the engaging locking bolt or bolts. This noise would attract the driver's attention, and upon determining the cause of the noise, he would either readjust the loosened nuts or proceed with proper caution until he reached a place where equipment was available to reclamp the lugs rigidly in position. From the above description it will be apparent that I have produced rim locking appliances which embody the features of advantage set forth as desirable in the statement of the object of the invention, and which is susceptible of modification in various particulars without departing from the principle of construction and mode of operation involved or from the spirit and scope of the appended claims.

I claim:

1. The combination of a circular support, a wheel rim surrounding the same, a rod extending non-rotatably and transversely through the support and provided at one end with an enlargement abutting the inner side of the support and with a socket near the other end, a wedge lug fitting on the socketed end of the rod and engaging the support and rim to clamp the latter in place, and a lock carried by the lug and engageable with the socket of the rod.

2. The combination of a circular support, a wheel rim surrounding the same, a rod extending non-rotatably and transversely through the support and provided at one end with an enlargement abutting the inner side of the support and with a socket near the other end, a wedge lug fitting on the socketed end of the rod and engaging the support and rim to clamp the latter in place, a lock carried by the lug and engageable with the socket of the rod, and means engaging the lug and rod and adjustable to effect the clamping of the rim by the lug and to dispose the said rod for the engagement of its socket by the lock.

In testimony whereof I affix my signature.

BONY GRAY.